No. 809,403. PATENTED JAN. 9, 1906.
C. STRAESSER.
LINE HOLDER.
APPLICATION FILED DEC. 22, 1904.
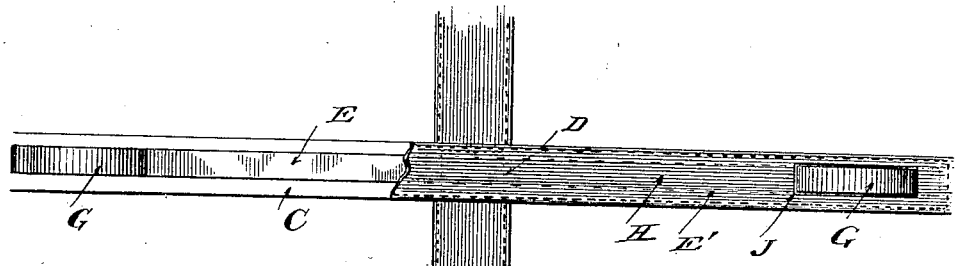
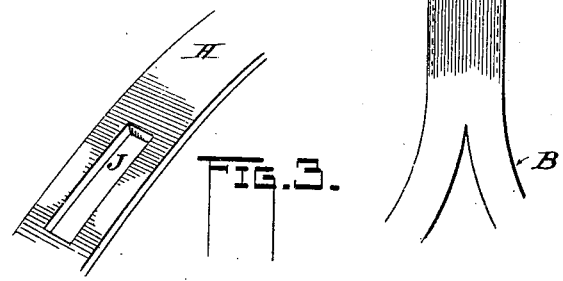
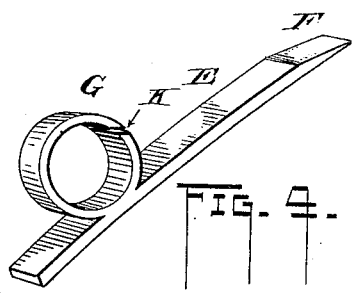
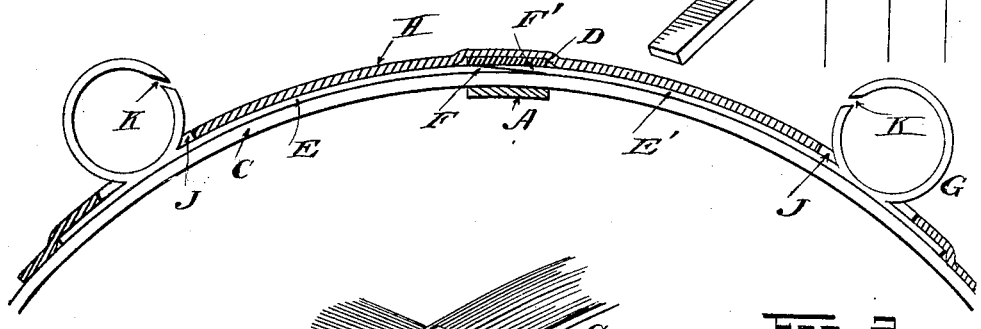
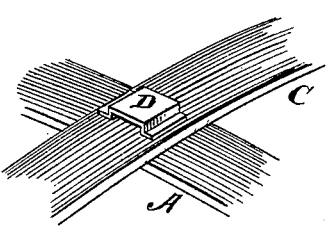
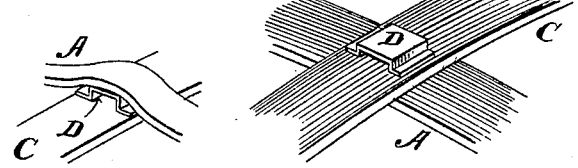
Witnesses:
Inventor:
Christian Straesser,
By L. M. Thurlow,
Atty.

UNITED STATES PATENT OFFICE.

CHRISTIAN STRAESSER, OF PEORIA, ILLINOIS.

LINE-HOLDER.

No. 809,403.  Specification of Letters Patent.  Patented Jan. 9, 1906.

Application filed December 22, 1904. Serial No. 238,015.

*To all whom it may concern:*

Be it known that I, CHRISTAIN STRAESSER, a citizen of the United States, residing at Peoria, in the county of Peoria and State of Illinois, have invented certain new and useful Improvements in Line-Holders; and I do hereby declare that the following is a full, clear, and exact description of the invention, which will enable others skilled in the art to which it appertains to make and use the same.

This invention relates to line-holders for use of harnesses.

The object of the invention is to provide means for attachment to the hip-strap of harness for supporting the lines and holding them upon the back of the horses, thereby preventing them from falling beneath the hind feet of the animal. It is a common occurrence to have the lines fall upon the ground beneath the feet of the horse because they are not properly attached to the dashboard or other part of the vehicle. In fact, though carefully attached to the vehicle, the switching of the horse's tail often causes the lines to become loosened. When this occurs, accidents often happen, and it is the aim of my invention to overcome these annoyances and dangers.

In the appended drawings, Figure 1 is a top view of the hip-strap and back-strap of a harness, showing my attachment therefor. Fig. 2 is an elevation of the same in part section. Fig. 3 is a perspective view of a portion of a covering-strap, which I may use to hide parts of my device. Fig. 4 is a perspective view of a portion of my device. Fig. 5 is a perspective view of the hip and back straps where they cross, showing a housing for the adjacent ends of two portions of my device, to be described. Fig. 6 is a modified form of the same.

In the figures, A represents the back-strap where it passes back to the crupper B. The hip-strap (indicated at C) crosses the back-strap at right angles either above or beneath, as the case may be; but in the drawings I have shown it above the said back-strap, to which it is usually sewed. In Fig. 5 is shown a metal loop or housing D placed upon the hip-strap, as shown; but if the position of the two straps is reversed, in that the back-strap passes over the hip-strap, the usual stitching may be cut slightly, so that the former may be raised, after which the said loop D may be inserted between the two, as shown in Fig. 6.

I now provide two members, one of which is shown in Fig. 4, which consists of a length of metal E of rectangular cross-section, having one end slightly beveled, as at F, and near the opposite end a ring G. This entire member may be cast in one piece or formed from wrought-iron with the ring G riveted thereto, if desired. The portion E is preferably made in a long curve, as shown in Fig. 2, to more nearly conform to the slope of the horse's back, as will be understood. The companion member E' in Fig. 2 has its end oppositely beveled at F' to lie upon F, as shown. However, these ends may be abutted within the loop D, if desired. These members E and E' may now be secured to the strap C in any good manner or, as shown in the drawings, may be covered from view by sewing a strap H upon said strap C, as shown in Figs. 1 and 2, there being a slot J cut in the ends of said strap H to permit the rings G to pass through, as will be understood by a glance at Figs. 2 and 3. By stitching the strap H to the strap C at both sides and ends it will be seen that the members E and E' will be firmly held in place without further means, and the latter will be stiff and stand any amount of strain without moving a particle. If desired, of course, the members may be riveted to the strap C without covering of any kind; but the former method will be found to make the neatest job. For convenience I prefer to open each ring G by forming an upwardly-extending slit, as shown. The slits are thus peculiarly placed, so that the lines cannot voluntarily slip from the rings, but are of sufficient width to permit the lines to be passed into and out of the ring edgewise.

Changes of one kind and another may be made in my improved line-holding device without departing from the spirit and intent of the invention.

I am aware that rings have been used heretofore which have been screwed into a small metal piece in the hip-strap; but this construction has been found to be at fault, for the reason that the rings often become loosened and lost and the straps are weakened by this method. By having flat members, such as I employ, the strap is stiffened and cannot turn over upon the back of the horse. Furthermore, there is no necessity of mutilating the straps in applying said members. As a matter of fact, the loop D may be dispensed with, if desired, and the stitching will answer every purpose. Furthermore, the members may be made in one piece, if desired; but I have found it convenient to use the two pieces, so that their ends can be passed beneath the strap A, as has been described.

I claim—

1. As an article of manufacture a long flat metal member curved in the arc of a circle and having near one end a ring, there being a slit in said ring opening upward and inward into the ring, said slit being in the side of the ring nearest the longest extremity of the member carrying it.

2. In a line-support, a pair of curved rigid members placed end to end in line with one another, a ring carried by each said member, the openings thereof being at right angles to the length of the said members, there being upwardly and inwardly extending slits in the rings for the passage of the driving-reins in combination with the hip-strap of a harness to which the members are secured, as set forth.

3. In a line-support, a pair of members in line with one another, a ring on each said member, each said ring having an upwardly and inwardly extending slit or opening for the passage of the line, in combination with the hip-strap of a harness, a covering member through which the rings extend, said covering member covering the ring-carrying members, and a member at the adjoining ends of the said ring-carrying members for securing those ends against movement as set forth.

4. The combination with the hip-strap C of a harness, of the flat and long members E and E' lying upon said strap, the housing D inclosing the adjacent ends of the members, the rings G G formed with the said members, there being openings in said rings, and the covering H for covering all but the rings from view.

In testimony whereof I affix my signature in presence of two witnesses.

CHRISTIAN STRAESSER.

Witnesses:
L. M. THURLOW,
E. J. ABERSOL.